(12) United States Patent
Ahomäki et al.

(10) Patent No.: US 8,732,231 B2
(45) Date of Patent: May 20, 2014

(54) PROVISION OF SERVICES THROUGH COMMUNICATION NETWORKS

(75) Inventors: Timo Ahomäki, Espoo (FI); Teemu Ikonen, Espoo (FI); Juha Koponen, Helsinki (FI); Risto Vuorjoki, Espoo (FI)

(73) Assignee: Mavenir Systems, Inc., Richardson, TX (US)

( * ) Notice: Subject to any disclaimer, the term of this patent is extended or adjusted under 35 U.S.C. 154(b) by 1258 days.

(21) Appl. No.: 12/521,265

(22) PCT Filed: Jan. 12, 2007

(86) PCT No.: PCT/FI2007/050015
§ 371 (c)(1),
(2), (4) Date: Aug. 18, 2009

(87) PCT Pub. No.: WO2008/084133
PCT Pub. Date: Jul. 17, 2008

(65) Prior Publication Data
US 2010/0069052 A1    Mar. 18, 2010

(51) Int. Cl.
*G06F 15/16* (2006.01)
*G06F 17/30* (2006.01)
*G06Q 10/10* (2012.01)
*H04L 29/08* (2006.01)

(52) U.S. Cl.
CPC ............ *G06F 17/3089* (2013.01); *G06Q 10/10* (2013.01); *H04L 67/26* (2013.01)
USPC ............................ 709/202; 709/205; 709/206

(58) Field of Classification Search
CPC .. G06F 17/3089; H04L 67/26; H04L 37/2606
USPC ........................................ 709/202, 205, 206
See application file for complete search history.

(56) References Cited

U.S. PATENT DOCUMENTS

| | | | |
|---|---|---|---|
| 2004/0117199 A1 | 6/2004 | Fremantle et al. | |
| 2008/0021963 A1* | 1/2008 | Jana et al. | 709/206 |
| 2008/0215985 A1* | 9/2008 | Batchelder et al. | 715/731 |
| 2009/0106100 A1* | 4/2009 | Mashinsky | 705/14 |
| 2010/0325107 A1* | 12/2010 | Kenton et al. | 707/723 |

OTHER PUBLICATIONS

Pfeifer T. et al. 'm-Mag: The Mobile Magazine Services Platform'. In: Proceedings of the 2005 Second IEEE International Workshop on Mobile Commerce and Services (WMCS#05). Munich, Germany Jul. 19-19, 2005, Piscataway, NJ, USA,IEEE.

(Continued)

*Primary Examiner* — Hieu Hoang
(74) *Attorney, Agent, or Firm* — Andrews Kurth LLP

(57) ABSTRACT

Disclosed is a method for providing services through a communication network to an end user device connected to the communication network, the method comprising allowing a service to be defined by providing a pointer to a standard format file comprising content for the service, reading content from the standard format file, and sending at least some part of said content through said communication network to the end user device.

17 Claims, 6 Drawing Sheets

(56) References Cited

OTHER PUBLICATIONS

Pfeifer T. et al. 'UGetMobile End-user Mobile Publishing Platform'. In: Proceedings of Joint Conference Sth IEEE International Conference on e-Commerce and Technology/3rd IEEE International Conference on Enterprise Computing, e-Commerce and e-Services/3rd IEEE International Workshop on Mobile Commerce and Wireless Services/Joint Workshop 2nd International Workshop on Business Service Networks/2nd International Workshop on Service Oriented Solutions for Cooperative Organizations. Jun. 26-29, 2006, San Francisco, CA, USA.

Crkvenac B. 'Mobile operator's IT middleware infrastructure'. In: Information Technology Interfaces, 2003. ITI 2003. Proceedings of the 25th International Conference on Jun. 16-19, 2003, Piscataway, NJ, USA,IEEE.

Chaniotakis E. et al., External service provision in telecommunications networks using open interfaces. Computer Communications, Jan. 1, 2004, vol. 1.27, No. 1, pp. 1-12, ISSN 0140-3664.

* cited by examiner

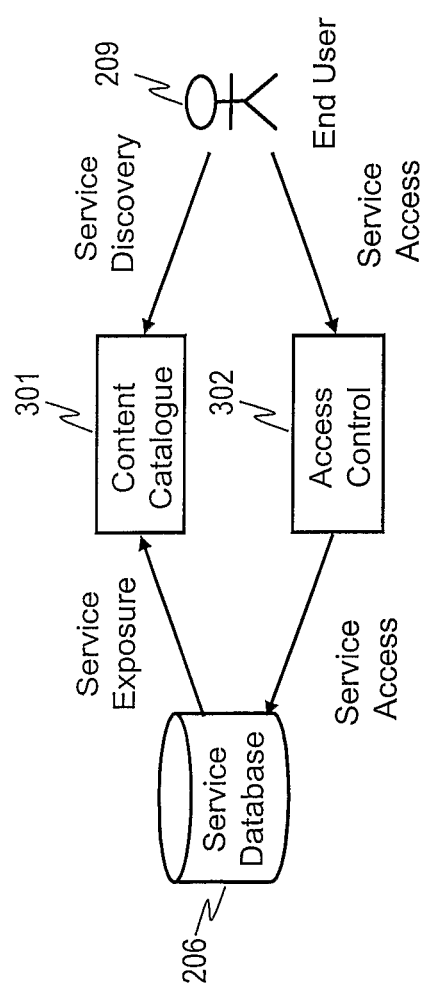
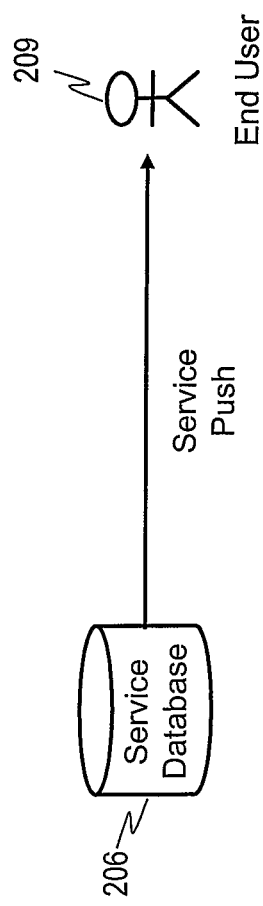
Fig. 3A
Fig. 3B

PROVISION OF SERVICES THROUGH COMMUNICATION NETWORKS

FIELD OF THE INVENTION

This invention relates in general to provision of services through communication networks.

BACKGROUND OF THE INVENTION

Mobile services, such as providing content to mobile devices by means of SMS, MMS or some other messaging system, have become very popular. However provision of such services may be challenging for a content provider. Producing content/services suitable for mobile environment often requires knowledge of telecom specific technologies. Alternatively some special purpose interfaces may be used, but such interfaces may be expensive to develop and challenging to maintain. Thus, there may be a technical and/or a financial barrier to produce mobile content/services.

FIG. 1 shows an example system illustrating some prior art solutions, which may be used for providing mobile services. The services are provided from a service provider system 101 to a mobile device 102 of an end user through a network operator system 104. The network operator system may provide communication services to mobile devices for example through a GSM network or a WCDMA network. The network operator system 104 provides an interface 105 for service provider system for providing mobile services through the network operator system. The interface 105 may be for example a WSI (Web Services Interface) interface, a CORBA (Common Object Request Broker Architecture) interface, a HTTP/XML (HyperText Transfer Protocol/eXtended Markup Language) interface, a legacy SMSC/MMSC (Short Message Service Centre/Multimedia Message Service Centre) protocol interface, etc. WSI, for example, is a powerful tool for providing various types of services, but it may be difficult to use especially to persons who do not have computer programming skills. Additionally there are many vendors specific flavours of WSI, whereby a content provider may need to know various different interfaces. Similar challenges may apply to other known interfaces.

One available option for making provision of mobile services easier is to have additional computer program modules 107 and 108 in the network operator system and in the service provider system. The program modules are designed to communicate with each other. The program module in the service provider system 101 may have an additional user interface 110 to be used by the service provider. Development of such content providing system comprised of additional program code modules is however expensive. Moreover such content providing system is typically network operator specific and thus the service provider cannot use the same system with different network operators. Thereby, if the service provider wants to provide the service to subscribers of various different network operators, the service provider may need to use various different content providing systems.

Thus there is a need to further develop mechanisms for providing services through communication networks.

SUMMARY OF THE INVENTION

According to a first aspect of the invention there is provided a method for providing services through a communication network to an end user device connected to the communication network, the method comprising allowing a service to be defined by providing a pointer to a standard format file comprising content for the service,
reading content from the standard format file, and
sending at least some part of said content through said communication network to the end user device.

The standard format file may an external standard format file, a web feed file, such as an Atom and/or RSS feed file.

By employing content stored in a standard format file, the paradigm of known service creation procedures is changed in various embodiments of the invention. That is, instead of defining yet another service creation protocol in addition to the existing ones, a different approach to the whole procedure is employed.

Further, by allowing the content of a service to be provided by means of a standard format file, one achieves that a content producer does not need to be aware of communication network specific technologies/protocols/interfaces etc.

The method may further comprise creating at least one of the following based on sending content to the end user device: billing information and settlement information.

In an embodiment of the invention content is read from said standard format file periodically or upon receiving a request for content.

In an embodiment of the invention the steps of reading and/or sending is conducted responsive to predefined conditions. The predefined conditions may include at least one of the following: receiving a request for content, finding new content in said standard format file, and finding content matching a predefined definition in said standard format file.

In an embodiment of the invention the method further comprises selecting which parts of the content to send depending on one of the following: the properties of the end user device and connection properties between the communication network and the end user device.

The content may be sent to the end user device by means of at least one of the following: SMS messaging, MMS messaging, instant messaging, and an email.

The method may further comprise
performing access control procedures before proceeding to sending content to the end user device.

Additionally or alternatively, the method may comprise allowing a service to be defined only if the creator of the service has the right to define said service.

In an embodiment of the invention the method further comprises
receiving a response message from the end user device,
parsing response content from said response message, and
writing at least part of said response content into a standard format file.

According to a second aspect of the invention there is provided an apparatus for providing services through a communication network to an end user device connected to the communication network, the apparatus comprising
a user interface operable to allow a service to be defined by
providing a pointer to a standard format file comprising content for the service, and
a processing unit configured
to co-operate with a reader component operable to read content from the standard format file, and
to send at least some part of said content through said communication network to the end user device.

According to a third aspect of the invention there is provided a system for providing services through a communication network to an end user device connected to the communication network, the system comprising a user interface operable to allow a service to be defined by
providing a pointer to a standard format file comprising
content for the service, a reader component operable to read content from the standard format file, and a processing unit operable to send at least some part of said
content through said communication network to the end
user device.

According to a fourth aspect of the invention there is provided a memory medium comprising computer executable program code adapted to enable an apparatus to perform the method of the first aspect.

It should be appreciated that subject matter of one embodiment related to one aspect may be combined with some other aspect or embodiment where applicable.

BRIEF DESCRIPTION OF THE DRAWINGS

The invention will be described, by way of example only, with reference to the accompanying drawings in which:

FIG. 3A shows a system according to an embodiment of the invention;

FIG. 3B shows a system according to another embodiment of the invention;

DETAILED SPECIFICATION

Figure 1:
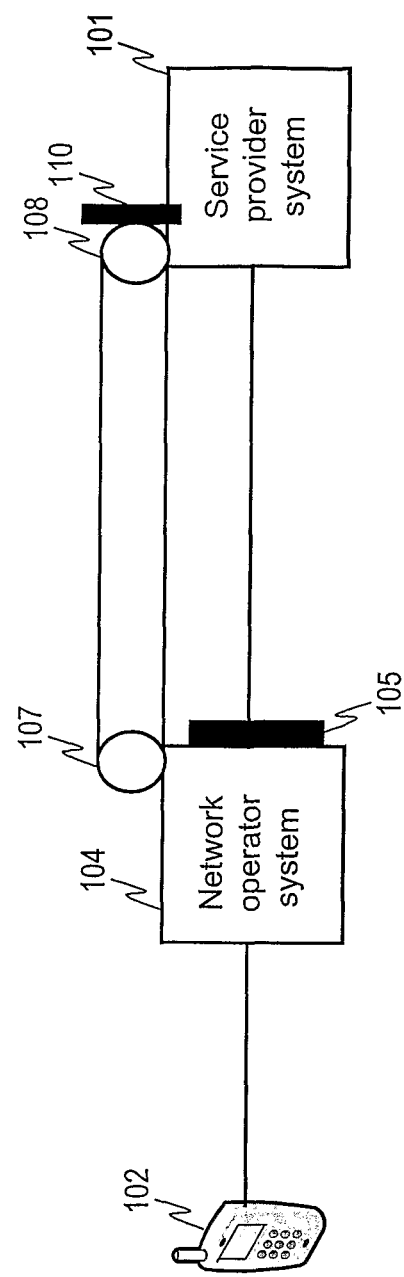
FIG. 1 shows a system according to prior art.

FIG. 1 is discussed above in connection with prior art.

In the following description, like numbers denote like parts.

In some embodiments of the invention web feeds and blogging systems, which are known in the Internet community, are employed for providing services through communication networks.

A web feed is a data format used for serving users (frequently) updated content on a web site. Content distributors syndicate a web feed, thereby allowing users to subscribe to it. Making a collection of web feeds accessible in one spot is known as aggregation. In general a web feed is a standard data format and it may comprise entries, which may be for example headlines, full-text articles, excerpts, summaries, and/or links to content on a web site, along with various metadata. To provide a web feed, a content provider of a web site may use specialized software tools (such as a content management system) that publish a list (or a "feed") of recent articles or content in a standardized, machine-readable format. In a typical scenario of using web feeds, the content provider publishes a feed link on the web site and end users can register the feed link with a feed reader. The feed reader then checks, whether the feed links registered with it have new content, and if so, the feed reader may for example make a note of the new content or download it. The feed reader may perform this check for example upon request or periodically.

A weblog or a blog is in general a user generated website where entries are made in journal style and displayed in a reverse chronological order. There are various easy-to-use publishing or "blogging" tools/services, such as for example Blogger and WordPress, available for anyone. The widespread use of such blogging tools proves that there is no technical barrier in using them. The blogging tools generally produce also web feeds on the basis of the content that is published in the blog.

RSS is one format of web feeds. The initials "RSS" may refer to various parallel standards like:
Really Simple Syndication (RSS 2.0),
Rich Site Summary (RSS 0.91, RSS 1.0), and
RDF Site Summary (RSS 0.9 and 1.0).

In connection with various embodiments of the invention any one of these or some other respective standard may be used. RSS delivers its information as an XML file, which may be called for example an RSS feed.

Atom Syndication Format is another format of web feeds that may be used in connection with various embodiments of the invention. It should however be appreciated that also some other web feed format or other suitable standard format of published information may be used in connection with the invention.

Figure 2:
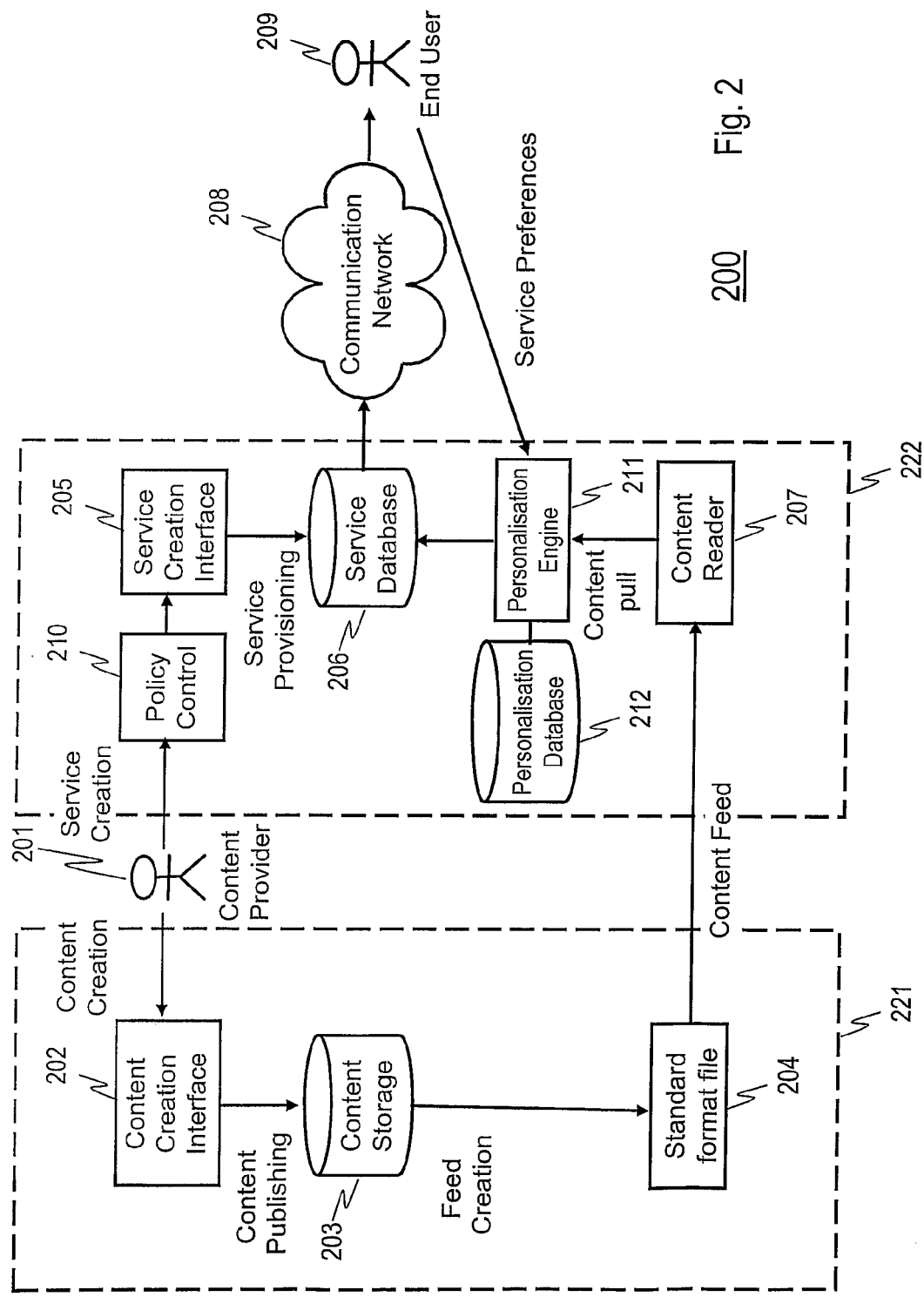
FIG. 2 shows a system according to an embodiment of the invention.

FIG. 2 shows a system 200 according to an embodiment of the invention. The system comprises a content creation system 221 (shown with dashed line) and a service provisioning system 222 (shown with dashed line). The service provisioning system is connected to or part of a communication network 208 and an end user 209 is connected to the communication network.

The content creation system 221 comprises a content creation interface 202, a content storage database 203 and a standard format file 204 comprising created content in a standardized format. The service provisioning system 222 comprises a policy control block 210, a service creation interface 205, a service database 207, a personalisation engine 211 and it's associated preference database 212 and a content reader block 207 operable to read content for example from the standard format file 204 of the content creation system 221. The content creation system may be for example some blogging system and the service provisioning system may be for example an SDP (Service Delivery Platform) element of a network operator.

A content provider 201 has an access to the content creation system 221 and the service provisioning system 222 through the user interfaces 202 and 205. The content provider 201 creates content through the content creation interface 202, which may be for example a commonly available interface used for creating blog entries. Through the content creation interface the content is stored into the content storage database 203 for example as a HTML file. Content form the content storage is supplied to the standard format file 204, which may be for example a web feed file such as an RSS/Atom feed file. Herein it should be clear that the content creator first creates only initial content and then updates the content as new content becomes available/is needed/etc.

In addition to creating the content through the content creation interface 202 the content provider 201 defines the services, which are desired to be provided to end users, through the service creation interface 205 of the service provisioning system. The service creation interface may be a standalone interface or it may be integrated into the content creation interface 202. Definition of the service includes providing a pointer or an address to the standard format file 204 containing the content for the service. The pointer may be for example an URL (Uniform Resource Locator) or a file path in some specific system. In the shown system there is a policy control block 210 in connection with the service creation interface, but this is optional. The policy control block checks, what kind of rights the content provider has and controls the service creation process accordingly. The policy control block may for example control, which type of services may be provided and/or to whom those services may be provided. The service defined through the service creation interface 205 is provisioned by storing it into the service database 206. In accordance with the services stored in the service database and/or requests received from the end user 209, the content reader block 207 is controlled to read content from the standard format file 204 and at least some parts of the content read from the standard format file are provided as service to the end user 209 through the communication network 208. The services (including content, scheduling, etc.) provided to the end user can be optionally controlled by the personalisation engine 211 that can be configured by the end user over the communications network 208. The preferences of end users that are used in the personalisation engine are stored in an associated personalisation database 212.

The communication network may be for example a GSM network, a WCDMA network, a LAN network, a WLAN network or some other wither fixed line or wireless network. The content may be sent to the end user by means of SMS messaging, MMS messaging, instant messaging or emails for example. In addition, a standard web/WAP (Wireless Application Protocol) browser can be used to access the content over a network (fixed line or wireless) carrying internet traffic. The service creation interface 205 may allow the content provider to define users for their service (access control lists) and also a preferred method of content delivery for specific users (for example some may want to receive the content by means of SMS messaging and some by email), but this is not mandatory.

The service provisioning system 222 of FIG. 2 may also create billing information on the basis of the services provided by the service provisioning system and convey the billing information to billing systems for further processing. An end user may be billed for example on a pay-per-view basis or on the basis of weekly/monthly/yearly/etc. subscription. It is also possible that the end user gets the service free and the content provider is billed for having their content published or that the network operator pays the content provider for the use of the content.

In addition to billing information, settlement can be provided through the service provisioning system 222. In this case, the content provider 201 can be remunerated depending on the actual usage of his/her services. Such settlement can be provided either as a money transfer, adding credits to a pre-paid account or some other method of crediting the content provider.

For the content provider 201 of FIG. 2 the service creation process is kind of a one time process: once the service has been created (the location of the content feed has been defined into the service provisioning system) the content provider may not need to access the service provisioning system anymore unless there is a need to modify for example user rights related to the service. Whereas the content creation system is the tool that the content provider is constantly using when providing new content for the service.

Like mentioned above, the content creation system 221 may be for example some blogging tool. However, also some other well standardised publishing systems than blogging tools may be employed. An advantage achieved by using well known blogging tools is that the content provider does not need to learn to use any new tools for creating the content. Like already mentioned above, the widespread use of such blogging tools proves that there is no technical barrier in using them.

Like mentioned above, the service provisioning system 222 may be for example an SDP element. However, the service provisioning system may comprised also in some other network operator system, through which messaging services may be controlled.

In practice, the blocks of the content creation system 221 may reside in one physical computing device, which may be for example content provider's own server or it may be a system provided by some blogging tool/service provider. Likewise, the blocks of the service provisioning system 222 may reside in one physical computing device. Alternatively some or all of the different blocks of the content creation and the service provisioning systems may reside in different physical devices. For example the service provisioning system 222 may be divided into two physically separate devices, one hosting the content reader 207 and another hosting the other elements of the service provisioning system. In this way one may have a firewall between the core of the service provisioning system and the content reader, which may require access to the Internet or some other open network.

It should however be appreciated that it is equally possible that the content creation system may be included in the service provisioning system instead of being a separate system. That is, a network operator may provide blogging tools as part of its service provisioning system. An advantage achieved by using a separate external content creation system, such as well known blogging tools, is that the content provider may use the same content for more than one publishing channel. For example, the same content may be provided through more than one network operator and/or the content may be made available in a conventional way through Internet as well.

It should be appreciated that the system shown in FIG. 2 is only an example and that in a practical implementation one or more of the shown elements may be left out or replaced by some other element. A practical implementation may also comprise various additional elements, which are not shown in FIG. 2.

FIG. 3A shows a system according to an embodiment of the invention. The shown system comprises the service database 206 and the end user 209 of FIG. 2. Further the system comprises a content catalogue block 301 and an access control block 302. It should be appreciated that operation of the blocks 301 and 302 is unrelated and that in a specific implementation of the shown embodiment either one of the blocks 301 and 302 may be left out.

The services stored in the service database 206 are exposed to the content catalogue 301 such that the end user 209 may discover the services that are available and thereby may find out what kind of services may be requested and how. In practise the content catalogue may be for example a web site listing available services. Optionally, the personalisation engine 211 can be used to control which of the services provisioned in the service database 206 are presented to a specific end user through the content catalogue 301.

When the end user 209 requests for service the access control block 302 may check, whether the end user 209 does have necessary access rights for the requested service. Then the service is provided only if the necessary access rights are in place.

FIG. 3B shows a system according to another embodiment of the invention. Like the system of FIG. 3A, the shown system comprises the service database 206 and the end user 209 of FIG. 2. Now the services stored in the service database 206 are pushed to the end user 209 without any specific request. As an example the end user 209 may have made a long-term request to be informed whenever there is new content available or whenever there is certain type of new content available. For example the personalisation engine 211 can be used to control the subscriptions to services and to control the timing and frequency of the pushed content.

Figure 4A:
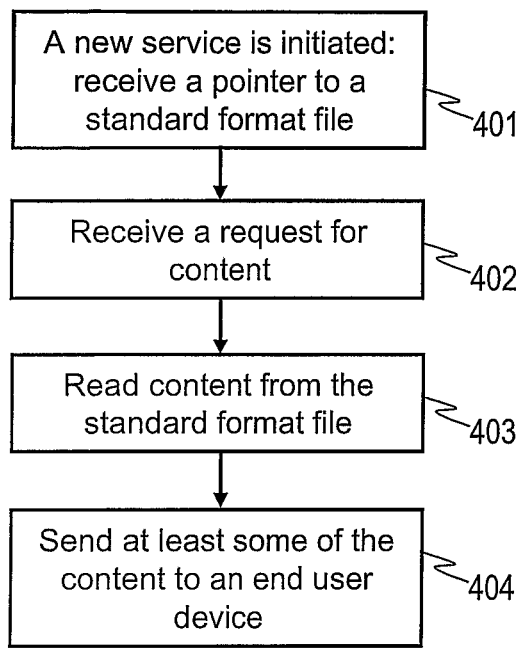
FIG. 4A shows a flow chart of a method according to an embodiment of the invention.

FIG. 4A shows a flow chart of a method according to an embodiment of the invention. The method may be conducted for example in the service provisioning system 222 of FIG. 2. In phase 401a new service is initiated and a pointer is received to a standard format file, the pointer being related to the new service. Then a request for content is received for example from an end user device in phase 402. The end user may have looked for desired service for example in a content catalogue 301 of FIG. 3A. The request may be for example for a specific piece of content or for the newest content available through the service. On the basis of the request content is read from the standard format file related to the service in phase 403. Then at least some of the read content is sent to the end user in phase 404. The reason for leaving out some content may be for example that the content is filtered in accordance with the properties of the device used by the end user or in accordance with end user preferences stored in the personalisation database 212.

Figure 4B:
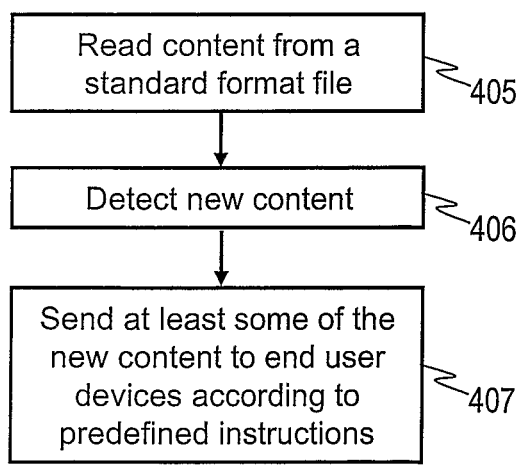
FIG. 4B shows a flow chart of a method according to another embodiment of the invention.

FIG. 4B shows a flow chart of a method according to another embodiment of the invention. Also this method may be conducted for example in the service provisioning system 222 of FIG. 2. In phase 405 content is read from a standard format file (a pointer to the standard format file has been provided beforehand like in phase 401 of FIG. 4A). Reading of the standard format file may be conducted for example periodically or in response to some predefined conditions. Then in phase 406, new content is detected in the standard format file, and at least some of the new content is sent to end user devices according to predefined instructions in phase 407. The predefined instructions may include for example information about end users to which certain content is to be sent and/or about in which format the content is to be sent.

Figure 5:
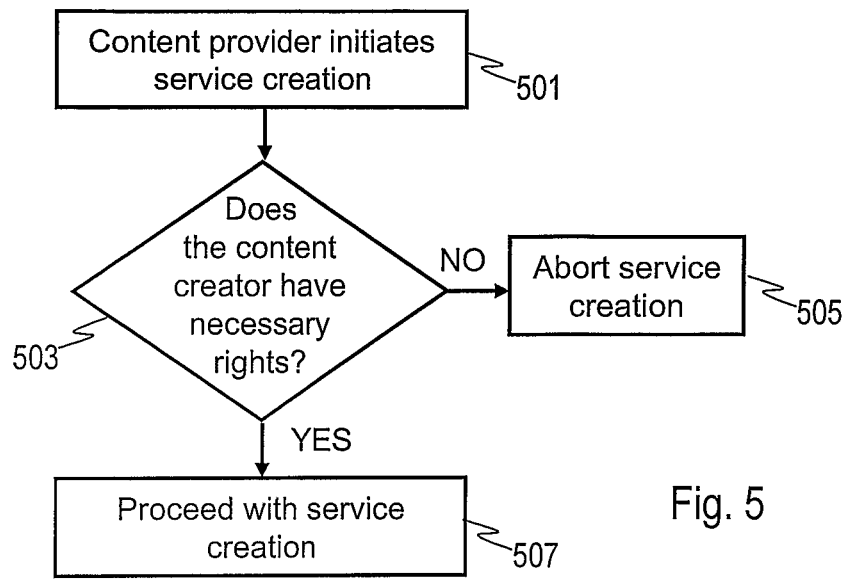
FIGS. 5-7 show flow charts of methods according to various embodiments of the invention.

FIG. 5 shows a flow chart of controlling service provisioning rights according to an embodiment of the invention. This may be done for example in the service provisioning system 222 and specifically in the policy control block 210 of FIG. 2. In phase 501, a content provider initiates service creation. It is assumed that at that point the content provider has already created the (initial) content through a content creation system. Alternatively, if the content provider knows where the content will reside, the service may be created before any content is created. Then in phase 503, it is checked whether the content provider has the necessary rights for creating the desired service. If the content provider does not have the necessary rights, the service creation is aborted in phase 505.

Figure 6:
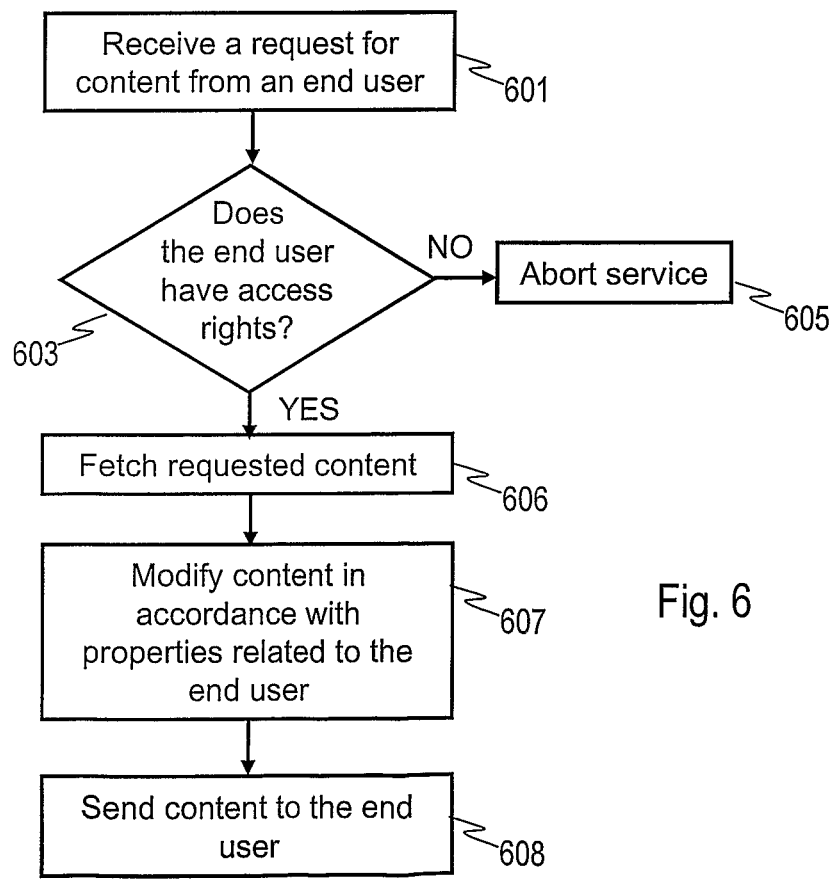

FIG. 6 shows a flow chart of access control according to an embodiment of the invention. This may be done for example in the service provisioning system 222 of FIG. 2 or in the access control block 302 of FIG. 3A. In phase 601 a request for content is received from an end user. Then it is checked in phase 603, whether the end user has necessary access rights for accessing the requested service. For example phone number or some other suitable identifier may be used for the purpose of identifying the end user. For example the service provisioning system 222 of FIG. 2 may allow a content provider to define a list of allowed end users (a white list) or a list of forbidden end users (a blocking list). The content provider may be allowed to define the service to be freely available for anyone as well. If the end user does not have the necessary rights, the service is aborted in phase 605.

If the end user does have the necessary rights, the requested content is fetched from the corresponding standard format file in phase 606. Then the fetched content is modified in accordance with properties related to the end user in phase 607. The content may be modified for example to suit better for the device that the end user is using. Another example is to modify content to better suit properties of the connection between the end user's device and communication network. (Properties of end user devices and connections they are using may be available for network operators, but the details of obtaining such information are out of scope of this application and thus not discussed herein any further.) In an embodiment of the invention the size of the content that is sent may be minimised, if the connection is very slow. For example, if the end user is using a wireless connection, only titles and text may be sent without any pictures, and if the end user is using a fixed line connection, also full pictures may be sent. Finally (the modified) content is sent to the end user in phase 608.

Figure 7:
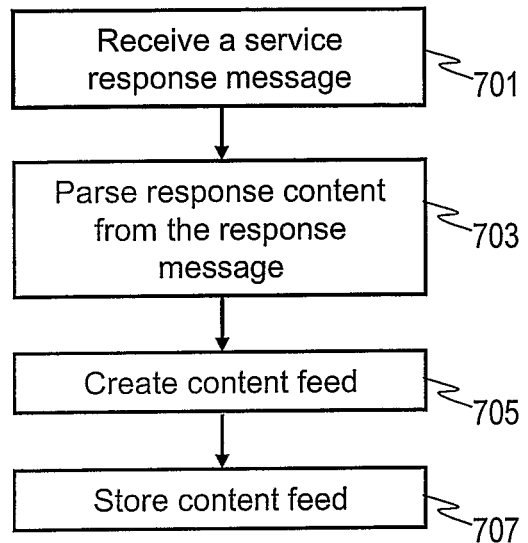

In an embodiment of the invention, an end user is allowed to provide a response message to content provided by means of a system of some embodiment of the invention. FIG. 7 shows a flow chart of processing response messages according to an embodiment of the invention. This may be done for example in the service provisioning system 222 of FIG. 2. In phase 701, a service response message is received. Then response content is parsed from the response message in phase 703 and a content feed is created on the basis of the parsed content in phase 705. In phase 707 the content feed is stored in a predefined standard format file (for example a web feed file). The standard format file may be for example dedicated to the responses related to certain service or it may be the same standard format file where the content of the service is stored, thereby allowing every end user to contribute to the creation of the service without a need to log in to the content creation system.

The response may be stored into the predefined standard format file for example by means of an additional content feed writer component or such functionality may be included for example in the content reader block 207 of FIG. 2.

One practical example of using the response messages is for example the following. An organiser of a sports club is arranging transportation to an event for the members of the sports club. Some of the members are taking a bus and some are coming with their own car. The organiser writes into blog of the sports club an entry informing the members of the forthcoming event and asks people to register, which transportation means they are taking so that they know for how many persons the bus needs to be arranged. The content of the blog entry is sent to the members through a system according to some embodiment of the invention. If desired, some members may receive the information by means of an SMS and some by email, for example. The members then respond through the same system and the responses are written by the system into the same blog of the sports club or into a separate transportation information blog (this may be freely defined by the organiser in the service provisioning system). The organiser may then later check the situation from on the basis of the responses written into the blog. Thereby there is no need to for example call all members or to send plurality of emails and collect the answers received by various communication means. Also, should someone be willing to volunteer to provide transport, this can be facilitated by allowing all users to see the offer.

It should be appreciated that the flow charts illustrating various embodiments of the invention are only examples and that in a specific implementation some of the shown phases may be left out without departing from the scope of the invention.

For example in the flow chart of FIG. 6, one might leave out phase 607 or phases 603 and 605. Also the order of the various phases may vary form the shown order and some or all of the phases may be repeated plurality of times.

The invention may be implemented by means of a computer program running on a suitable hardware platform or by means of any other suitable combination of hardware, software, special purpose circuits and/or logic.

Figure 8:
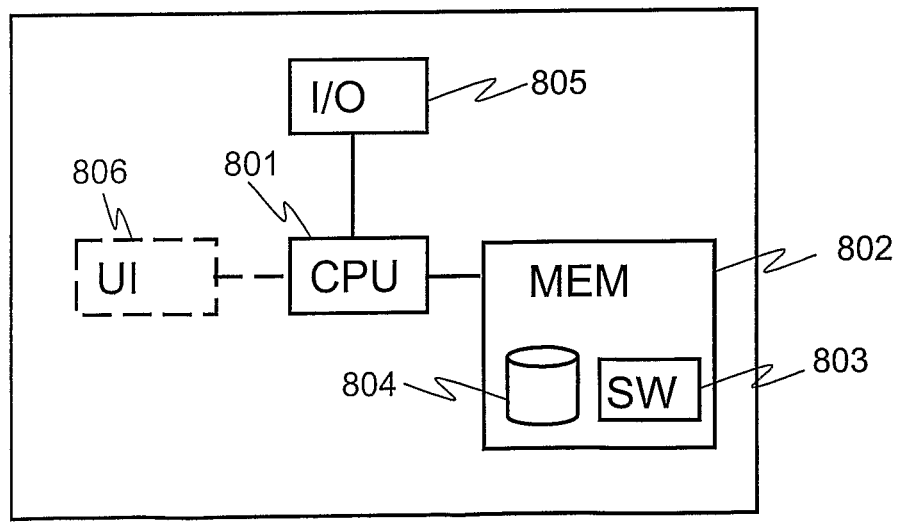
FIG. 8 shows a block diagram of an apparatus suited for implementing various embodiments of the invention.

FIG. 8 shows a block diagram of an apparatus 800 suited for implementing various embodiments of the invention. The apparatus 800 may be a typical computer, such as a general-purpose computer or a server, with possibly distributed functions. The apparatus comprises a Central Processing Unit (CPU) 801 for controlling the apparatus and a memory 802 including a computer program code or software 803.

The software 803 includes instructions for the CPU 801 to control the apparatus 800 such as an operating system and different computer applications. The software 803 may comprise instructions for controlling the apparatus to provide some functionality of the invention. The instructions may for example control the apparatus to operate as a service provisioning system according to some embodiments of the invention. The apparatus 800 further comprises an I/O (input/output) unit 805 such as a LAN (Local Area Network), Ethernet or WLAN (Wireless LAN) unit. The apparatus 800 could comprise also a user interface 806 (shown with dashed line), such as a display and a keyboard, but the user interface may be implemented also by means of a remote connection through the I/O unit.

It should be appreciated that in this document, words comprise, include and contain are each used as open-ended expressions with no intended exclusivity.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. Hence, the scope of the invention is only restricted by the attached patent claims.

The invention claimed is:

1. A method for providing services through a mobile communication network to an end user device communicatively coupled to the mobile communication network, the method comprising:
receiving and storing, from a content provider, a standard format file comprising content for the service, the standard format file being a web feed file generated by a standard web-based editing tool;
determining whether the content provider has permission to provide the content for the service;
defining a service by providing a pointer to the standard format file comprising content for the service, wherein the standard format file contains information to define the service;
receiving a request for the service from the end user device;
reading at least a portion of the content from the standard format file;
adapting the content read from the standard format file in accordance with properties of the end user device; and
sending at least a portion of the adapted content read from the standard format file through the mobile communication network to the end user device.

2. The method according to claim 1, wherein the standard format file has been generated by standard web blogging tools.

3. The method according to claim 1, wherein the standard format file is an external standard format file.

4. The method according to claim 1, further comprising creating at least one of the following based on sending content to the end user device: billing information and settlement information.

5. The method according to claim 1, further comprising reading content from the standard format file periodically or upon receiving a request for content.

6. The method according to claim 1, wherein the reading and sending is conducted responsive to predefined conditions, wherein the predefined conditions include at least one of the following: receiving a request for content, finding new content in the standard format file, and finding content matching a predefined definition in the standard format file.

7. The method according to claim 1, further comprising
receiving a response message from the end user device;
deteimining whether the end user device is authorized to provide response content to the defined service;
storing a content of the response message in a standard format file; and
including the content of the response message in the content for the defined service in response to authorization.

8. An apparatus for providing services through a mobile communication network to an end user device, the apparatus comprising:
a user interface operable to allow, in response to a policy control determination, a service to be defined by providing a pointer to a standard format file comprising content for the service, the standard format file being a standard web feed file generated by a standard web-based blogging tool, wherein the standard format file contains information to define the service; and
a processing unit configured:
to co-operate with a reader component operable to read content from the standard format file;
to adapt the content read from the standard format file to the properties of the end user device; and
to send at least a portion of the adapted content through the mobile communication network to the end user device.

9. The apparatus according to claim 8, wherein the standard format file is an external standard format file.

10. The apparatus according to claim 8, wherein the standard format file is an Atom and/or RSS feed file.

11. The apparatus according to claim 8, wherein the apparatus is further configured to create at least one of the following based on sending content to the end user device: billing information and settlement information.

12. The apparatus according to claim 8, wherein the processing unit is further configured to control the reader component to read content from the standard format file periodically or upon receiving a request for content.

13. The apparatus according to claim 8, wherein said processing unit is configured to control the reader component to read content from said standard format file and/or to send said at least portion of said the content responsive to predefined conditions, wherein the predefined conditions include at least one of the following: receiving a request for content, finding new content in the standard format file, and finding content matching a predefined definition in the standard format file.

14. The apparatus according to claim 8, wherein the apparatus is further configured to select which parts of the content to send depending on one of the following: the properties of the end user device and communication properties between the communication network and the end user device.

15. The apparatus according to claim 8, wherein the processing unit is further configured:
to receive a response message from the end user device;

to parse response content from the response message; and to co-operate with a writer component operable to write at least a portion of the response content into a standard format file.

16. A memory comprising computer executable program code adapted to cause an apparatus to allow, in response to a policy control determination, a service to be defined by providing a pointer to a standard format file comprising content for the service, the standard format file being a standard web feed file generated by a standard web-based editing software, wherein the standard format file contains information to define the service;

to read content from the standard format file comprising the standard web feed file;

to adapt the content read from the standard format file to the properties of the end user device; and to send at least a portion of the adapted content through the mobile communication network to the end user device.

17. The memory according to claim 16, wherein the read and send are conducted responsive to predefined conditions, wherein the predefined conditions include at least one of the following: receiving a request for content, finding new content in the standard format file, and finding content matching a predefined definition in the standard format file.

* * * * *